April 29, 1969   V. V. WEYANT   3,440,915
QUICK RELEASE CONNECTION
Filed Feb. 28, 1967
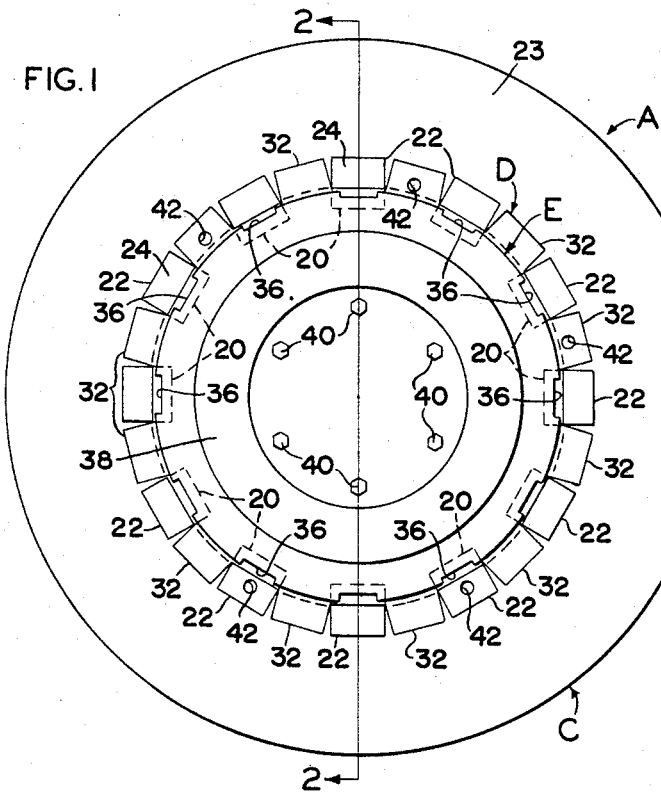
FIG.1
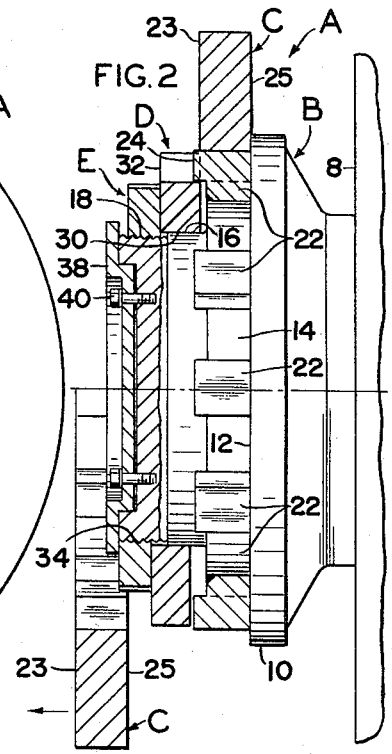
FIG.2
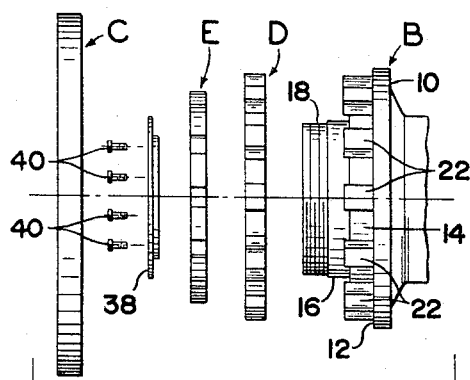
FIG.3
FIG.4
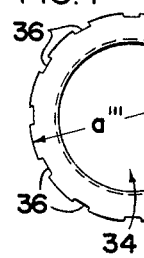
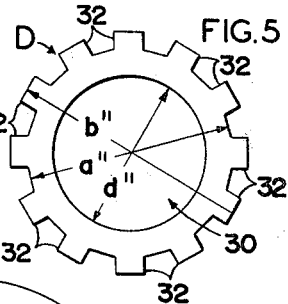
FIG.5
FIG.6
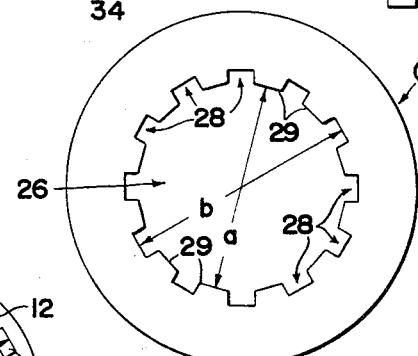
FIG.4A   FIG.7
INVENTOR.
VALONE V. WEYANT
BY
Meyer, Tilberry & Body
ATTORNEYS.

United States Patent Office 3,440,915
Patented Apr. 29, 1969

3,440,915
QUICK RELEASE CONNECTION
Valone V. Weyant, Hanoverton, Ohio, assignor to E. W. Bliss Company, Canton, Ohio, a corporation of Delaware
Filed Feb. 28, 1967, Ser. No. 619,396
Int. Cl. B26d 1/12, 1/14
U.S. Cl. 83—666                                    10 Claims

ABSTRACT OF THE DISCLOSURE

Apparatus for releasably connecting first and second machine parts in readily releasable and nonrotatable engagement. The disclosed apparatus comprises a first machine part with an end portion of circular cross-section and a radially extending inwardly spaced shoulder. A second machine part having an aperture extending therethrough is positioned on the first part in surrounding relationship thereto and in engagement with the shoulder. The first part is provided with means which engage the second part to prevent relative rotation but permit longitudinally relative movement outwardly of the shoulder. Radially extending washer means are rotatably carried on the first part. The outer periphery of the washer means can pass freely through the aperture in the second part in a first position of rotation but engages the part in a second position. Additionally, means are provided for moving the washer longitudinally of the end portion to bring it into engagement with the second part to clamp it against the shoulder.

The present invention is directed toward the art of connectors, and more particularly to an improved arrangement for connecting a pair of machine members in readily releasable engagement.

The invention is especially suited for use in connecting a cutting blade to an arbor in a rotary cutting machine of the type utilized for shearing or edge trimming metal plates and sheets, and it will be described with particular reference thereto; however, it is appreciated the invention is capable of broader applications and may be used wherever it is desired to releasably connect machine members in nonrotatable engagement.

Rotary cutting machines of the type used to trim or shear metal plates and sheets often comprise a pair of horizontally extending vertically spaced driven arbors. A disc type cutting blade is mounted on the end of each arbor. The cutting blades are positioned so that their outer peripheries or edges cooperate to shear material passed therebetween.

Because the blades must be frequently removed for maintenance or substitution of blades of a different size, means are provided for releasably connecting them to the arbors. These means have taken a variety of forms, all of which have generally been unsatisfactory. One form of connection commonly used consists simply of the use of a large number of bolts or cap screws which pass transversely through openings formed in the blade and into threaded openings formed in the arbor. Another connection often used consists of the provision of a circumferentially extending shoulder formed on the arbor. The outer end of the arbor is threaded and a large nut threaded onto the arbor to clamp or hold the blade in position against the shoulder.

In general, these prior connection arrangements are unsatisfactory for a variety of reasons. In the connection which incorporates cap screws or bolts, the time required for assembly and disassembly is substantial. The same problem is present in the nut type connection. It has been found that the nut type connection has other distinct disadvantages, especially in the larger size trimming machines. In the large size trimming machines the blades may be from three to four feet in diameter, and the diameter of the nut required may be in the range of from two to three feet. The weight of the nuts can be as much as 150 pounds and more. Consequently, it is necessary to use hoisting mechanisms to remove and replace the nuts. Further, problems are encountered in starting the threading of the nut on the arbor, including damage to the threads, etc.

The present invention overcomes the above problems and provides a releasable connection which is simply constructed and easily assembled and disassembled. Because of the unique arrangement provided, it is never necessary to remove any of the connection parts during the removal of the blade from the arbor.

In accordance with the present invention, an apparatus is provided for releasably connecting first and second machine parts in readily releasable and nonrotatable engagement. The apparatus comprises a first machine part in the form of a first body having a longitudinal axis and terminating in an end portion of circular cross-section. Means are carried by the first body for forming a radially extending shoulder inwardly spaced from the end portion. A second machine part in the form of a second body having first and second opposed faces and an aperture extending therebetween is positioned on the first body in surrounding relationship thereto and intermediate the end portion and the shoulder with the first of the faces in engagement with the shoulder. The first body is provided with means engageable with the second body for preventing the second body from rotating relative to the first body but permitting movement longitudinally thereof in a direction outwardly of the shoulder. Washer means are rotatably carried on the outer end portion of the first body and extend radially therefrom. The washer means have an outer periphery of a size and configuration to pass freely through the aperture in the second body in a first position of rotation on the end portion, but engageable with the second of said faces in a second position. Means are provided for moving the washer longitudinally of the end portion to bring it into engagement with the second of the faces of the second body to clamp the second body against the shoulder.

A primary object of the present invention is the provision of a readily releasable connection for connecting machine parts in nonrotatable engagement.

An additional object of the present invention is the provision of a connecting arrangement which permits the disassembly of two connected parts without the removal of any of the connecting elements.

A still further object is the provision of a connecting arrangement for connecting a rotary cutting disc to an arbor which greatly facilitates removal and replacement of the cutting disc.

These and other objects and advantages will become apparent from the following description used to illustrate a preferred embodiment of the present invention when read in connection with the accompanying drawings wherein:

FIGURE 1 is an end view of a connection arrangement formed in accordance with the present invention;

FIGURE 2 is a cross-sectional view taken on line 2—2 of FIGURE 1 and showing in the portion above the center line the parts in their assembled relationship, while in the portion below the center line the parts are shown in the relationship permitting disassembly of the connected members;

FIGURE 3 is an exploded view of the apparatus shown in FIGURE 2;

FIGURES 4 and 4A show two modifications of the nut member utilized in the present invention;

FIGURES 5 and 6 are detailed showings of the washer member and cutting disc utilized in the present invention; and, FIGURE 7 is an end view of the arbor member utilized in the present invention.

Referring now to the drawings wherein the showings are for the purpose of illustrating a preferred embodiment of the invention only, and not for the purpose of limiting same, FIGURES 1 and 2 show the overall arrangement of a blade connection assembly A, constructed in accordane with the present invention, and comprised of an arbor or spindle B having a rotary cutting blade C releasably connected thereto by a washer member D and a nut member E.

A second cutting blade would normally be mounted directly beneath and in slightly overlapping relationship with blade C. The actual drive arrangement used to rotate and/or adjust spindle B and blade C relative the cooperating subjacent blade form no part of the present invention.

As best shown in FIGURES 2, 3 and 7, arbor B comprises a first elongated body positioned with its longitudinal axis extending horizontally from the cutting machine frame 8. The outer end portion of arbor B is of circular cross-section and has a circumferentially extending shoulder 10 which defines a face surface 12 lying in a plane perpendicular to the longitudinal axis of the arbor, and inwardly spaced from the outer end. The portion of the arbor to the left of the shoulder is of stepped diameter and has a first section 14 which functions as the blade carrying section, and a second section 16 of reduced diameter which carries the nut and washer members E and D respectively. The outer end of section 16 is threaded at 18 for engagement with the corresponding threads of the nut member. A plurality of longitudinally extending notches or grooves 20 are formed at circumferentially spaced positions about section 14. Welded or otherwise connected in notches 20, and arranged to extend outwardly from the surface of section 14, are a corresponding number of key members 22. Key members 22 provide means whereby blade C is prevented from rotating relative to arbor B, but is permitted to move longitudinally thereof. Extending to the left from the outer end portion of each key member 22 is a portion 24. These portions 24 function, in a manner to be subsequently described, to prevent rotation of the washer member D relative to the arbor B when the assembly is in the assembled relationship.

As best shown in FIGURES 1 and 6, blade C is a relatively conventional shearing type cutting blade and comprises a fllat circular body formed, for example, from tool steel and having opposed faces 23 and 25. An aperture 26 extends transversely through the body and provides means for mounting it on the arbor B. As seen in FIGURE 6, the periphery of the aperture is provided with circumfetrentially spaced radially extending notches 28 arranged to provide radially inwardly extending portions 29. The notches 28 are sized and arranged so as to receive the key members 22 carried by the arbor. Preferably, the maximum and minimum diameters, $b$ and $a$ respectively, of aperture 26 are only slightly larger than the corresponding diameters $b'$ and $a'$ of the arbor; where $b'$ is the distance between the top surfaces of diametrically opposed key members, and $a'$ is the diameter of arbor section 14.

As can been from FIGURE 2, with the arbor and blade formed in the manner described above, the blade is adapted to be moved longitudinally to the right onto section 14 of the arbor to bring its face surface 25 into engagement with surface 12 of shoulder 10. The interengagement of key members 22 of the arbor with notches 28 of the blade prevent the blade from rotating except in response to rotation of the arbor.

The means used to maintain blade C in position on the arbor, while permitting it to be readily removed therefrom, comprise washer member D and nut member E. As best shown in FIGURES 1, 2 and 5, washer member D comprises a generally annular shaped member having a center aperture 30. Aperture 30 is of a diameter $d$ to fit closely on section 16 of the arbor. The outer periphery of the washer member D is of a size and configuration to pass freely through the central aperture 26 of blade C. As shown in FIGURE 5, the outwardly extending peripheral portions 32 are arranged to pass through the corresponding notches 28 formed in blade C, and the minimum and maximum diameters, $a''$ and $b''$ respectively, are slightly less than the corresponding minimum and maximum diameters, $a$ and $b$ respectively, of the aperture 26 of blade C. With washer member D positioned on the arbor in the manner shown in FIGURES 1 and 2, the outwardly extending peripheral portions 32 are adapted to be received between the longitudinally extending portions 24 of key members 22 and engage the radially inwardly extending portions 29 of blade C.

Nut member E functions to releasably maintain washer member D and blade C in this engaged condition. As shown in FIGURES 1, 2 and 4, the nut member comprises an annular member having an outer periphery of maximum diameter $a'''$ which is slightly less than the minimum internal diameter $a$ of the blade. The inner periphery of the nut is provided with threads 34 adapted to be received on the threaded end 18 of the arbor. The outer periphery is provided with notches for receipt of a spanner wrench for tightening and loosening the nut. Alternately, the outer periphery could be provided with gear teeth, as shown in FIGURE 4A. This modification permits the use of a power tool, such as an air driven torque wrench, for tightening and loosening the nut. As is readily apparent, by mounting a pinion gear in a rotatably driven power tool and providing an outwardly extending shaft on the pinion the nut can be tightened or loosened. Note that the shaft would be rotatably received in one of the openings 42 formed in the key member or the washer member and the pinion gear would be engaged with the gear teeth on the nut. Consequently, rotation of the pinion, depending upon its direction of rotation, would tighten or loosen the nut.

In order to prevent the nut from being inadvertently threaded off the arbor, a stop plate 38 is connected to the outer end of the arbor by a plurality of bolts or screws 40.

The above-described connection arrangement greatly facilitates removal and replacement of the blade. To remove the blade from the arbor, nut member E is simply untightened to the position shown in the bottom half of FIGURE 2. The washer member D is then slid longitudinally so that its outwardly extending portions 32 are no longer intermediate portions 24 of the key members. A slight rotation of the washer member then allows portions 32 to be aligned with the key members. Consequently, blade C can be slid to the left, passing over both the washer member and the nut member. Reversal of the procedure allows a new blade to be rapidly connected to the arbor.

Because it is never necessary to remove either the nut or washer from the arbor, the problems previously encountered in removing blades are overcome. Additionally, as can be seen in the bottom half of FIGURE 2, during the time the blade is being moved on or off the arbor, the threads 18 are completely covered and cannot be inadvertently damaged by contact with the blade.

The invention has been described in great detail sufficient to enable one of ordinary skill in the art of connectors to practice the invention. Obviously modifications and alterations of the preferred embodiment will occur to others upon a reading and understanding of this specification.

Having thus described my invention, I claim:

1. An apparatus for releasably connecting first and second machine parts in readily releasable and nonrotatable engagement, said apparatus comprising a first machine part in the form of a first body having a longitudinal axis and terminating in an end portion of circular cross-section, means carried by said first body for forming a radially extending shoulder inwardly spaced from said end portion; a second machine part in the form of a second body, said second body having first and second opposed faces with an aperture extending therebetween and being positioned on said first body in surrounding relationship thereto and intermediate said end portion and said shoulder, with the first of said faces in engagement with said shoulder, said first body being provided with means engageable with said second body for preventing said second body from rotating relative to said first body but permitting movement longitudinally thereof in a direction outwardly of said shoulder; washer means rotatably carried on said end portion of said first body and extending radially therefrom, said washer means having an outer periphery of a size and configuration to pass freely through said aperture in said second body in a first position of rotation on said end portion but engageably with the second of said faces in a second position; and means for moving said washer longitudinally of said end portion into engagement with said second of said faces to clamp said second body against said shoulder.

2. The apparatus as defined in claim 1, wherein said shoulder extends circumferentially around said first body.

3. The apparatus as defined in claim 1, wherein the means for preventing said second body from rotating relative to said first body comprise radially extending key members.

4. The apparatus as defined in claim 1, wherein the means for moving said washer longitudinally of said end portion comprises a nut member threadedly received on said end portion.

5. The apparatus as defined in claim 1, wherein said first body is an arbor and said second body is a circular cutting disc.

6. The apparatus as defined in claim 1, wherein said means for preventing said second body from rotating relative to said first body comprise radially extending key members having longitudinally extending portions engageable with said washer means for preventing rotation thereof while said washer is in clamping engagement with said second body.

7. The apparatus as defined in claim 1, wherein said means for moving said washer means longitudinally of said end portion comprises a nut member which is threadedly received on said end portion and extends radially outwardly thereof, the radial extent of said nut member being at all points less than the minimum radial extent of said washer means.

8. The apparatus as defined in claim 7, wherein said nut member is provided with tool receiving notches.

9. The apparatus as defined in claim 7, wherein said nut member is provided with gear teeth.

10. The apparatus as defined in claim 9, wherein said nut member has an outer periphery and said gear teeth are formed therein.

References Cited

UNITED STATES PATENTS

| | | | |
|---|---|---|---|
| 1,559,680 | 11/1925 | Denne | 83—666 |
| 2,031,246 | 2/1936 | Biggert | 83—666 |
| 2,815,077 | 12/1957 | Pechy | 83—481 X |

ANDREW R. JUHASZ, *Primary Examiner.*

F. T. YOST, *Assistant Examiner.*

U.S. Cl. X.R.

83—481, 676